(12) United States Patent
Ramos et al.

(10) Patent No.: US 7,693,376 B2
(45) Date of Patent: Apr. 6, 2010

(54) APPARATUS AND METHOD FOR PREVENTING UNWANTED EXPOSURE OF A DEVICE TO AN UNDESIRABLE SUBSTANCE

(75) Inventors: Rogerio T. Ramos, Eastleigh (GB); Barry Read, Bournemouth (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 104 days.

(21) Appl. No.: 11/910,655

(22) PCT Filed: Feb. 22, 2006

(86) PCT No.: PCT/GB2006/000607

§ 371 (c)(1),
(2), (4) Date: Jan. 16, 2008

(87) PCT Pub. No.: WO2006/106284

PCT Pub. Date: Oct. 12, 2006

(65) Prior Publication Data

US 2009/0129732 A1     May 21, 2009

(30) Foreign Application Priority Data

Apr. 5, 2005     (GB)     ................. 0506872.1

(51) Int. Cl.
*G02B 6/44* (2006.01)
*H01B 9/06* (2006.01)
*H02G 9/06* (2006.01)

(52) U.S. Cl. ............... 385/110; 385/105; 174/25 G; 174/26 G; 174/37

(58) Field of Classification Search ......... 385/105–106, 385/110–111; 174/25 G, 26 G, 37–39
See application file for complete search history.

(56) References Cited

U.S. PATENT DOCUMENTS

| | | | |
|---|---|---|---|
| 2,623,923 | A | 12/1952 | Zimmerman |
| 2,879,402 | A | 3/1959 | Ferre |
| 3,277,363 | A | 10/1966 | Schuster |
| 4,445,918 | A | 5/1984 | Modone |
| 4,776,208 | A | 10/1988 | Dimeff |
| 4,824,206 | A | 4/1989 | Klainer |
| 4,949,045 | A | 8/1990 | Clark |
| 5,141,595 | A | 8/1992 | Darling, Jr. |
| 5,281,247 | A | 1/1994 | Aikawa |
| 5,636,307 | A | 6/1997 | Cowen |

(Continued)

FOREIGN PATENT DOCUMENTS

DE     4226343 A1     2/1994

(Continued)

*Primary Examiner*—Jerry T Rahll
(74) *Attorney, Agent, or Firm*—Rodney Warfford; Daryl R. Wright; Trop Pruner & Hu PC

(57) ABSTRACT

Apparatus for preventing unwanted exposure of one or more devices to one or more undesirable substances includes at least one barrier disposed between the device and the undesirable substance. At least one shield substance is provided between the barrier and the device. The shield substance is capable of permeating the barrier sufficient to preclude at least substantial permeation of the undesirable substance through the barrier from the exterior of the barrier, preventing unwanted exposure of the device to the undesirable substance.

23 Claims, 2 Drawing Sheets

U.S. PATENT DOCUMENTS

| | | |
|---|---|---|
| 5,942,020 A | 8/1999 | Marcelissen |
| 6,343,173 B2 | 1/2002 | Hordvik |
| 6,577,795 B2 | 6/2003 | Tuminaro |
| 6,597,850 B2 | 7/2003 | Andrieu |
| 6,661,957 B1 | 12/2003 | Levenson |
| 6,727,827 B1 | 4/2004 | Edwards |
| 6,836,218 B2 | 12/2004 | Frey |
| 2001/0046357 A1 | 11/2001 | Hordvik |
| 2003/0002828 A1 | 1/2003 | Andrieu |

FOREIGN PATENT DOCUMENTS

| | | |
|---|---|---|
| DE | 10103412 A1 | 8/2002 |
| EP | 0023031 | 1/1981 |
| GB | 891245 | 3/1962 |
| GB | 2158264 | 11/1985 |
| JP | 61259857 | 11/1986 |
| JP | 05157951 | 6/1993 |
| JP | 06309943 | 11/1994 |
| WO | 2006/019476 | 2/2006 |
| WO | 2006106284 A1 | 10/2006 |

APPARATUS AND METHOD FOR PREVENTING UNWANTED EXPOSURE OF A DEVICE TO AN UNDESIRABLE SUBSTANCE

BACKGROUND OF THE INVENTION

1. Field of the Invention

The invention relates to apparatus, systems, and methods for preventing the unwanted exposure of a device to an undesirable substance.

2. Description of Related Art

Various types of devices are subject to damage or other undesirable effects when exposed to particular substances. As used throughout this patent, including the appended claims, the term "undesirable substance" means any one or more fluid, liquid, particle, substance, or combination thereof that may damage, alter the performance, or otherwise affect a device in a way that is not desired. As used throughout this patent, including the appended claims, the term "device" means any one or more machine, material, media, instrument, other item, or arrangement or combination thereof, that is desired to be at least partially isolated, or shielded, from exposure to, or contact with, one or more undesirable substances. Non-limiting examples of devices are optical fibre, sensors, and optical fibre sensors.

Devices that are carried in, encased, or at least partially surrounded by, a carrier or barrier may still be at risk for potential exposure to undesirable substances. In the petroleum exploration and production industry, for example, optical fibre carried in cables is often used to link optical fibre sensors to measurement instrumentation, or as part of an optical fibre sensing system, such as a distributed temperature sensing system. Exposure of some types of optical fibre to certain substances, such as hydrogen gas, may cause undesirable degradation of the optical properties of the fibre, especially in high temperature applications. Thus, the entry of hydrogen into the cables can lead to problems. Because hydrogen is a very small molecule, it is capable of permeating typical cables and, consequently, contacting and negatively affecting the optical fibre.

Thus, there remains a need for methods, apparatus, and/or systems having one or more of the following attributes, capabilities, or features: prevents unwanted exposure of one or more devices to one or more undesirable substances; prevents the unwanted entry of undesirable substances into cables; precludes the permeation of hydrogen into optical fibre-bearing cables that causes undesirable degradation of optical properties of or damage to the optical fibre; utilizes readily available shield substances to isolate devices from unwanted contact with undesirable substances; is simple and cost effective to implement; can be implemented with existing technology and components; is cost effective and simple to retrofit or adapt existing technology; and is useful with devices located in harsh environments.

BRIEF SUMMARY OF THE INVENTION

Various embodiments of the invention involve an apparatus for preventing unwanted exposure of at least one device to at least one undesirable substance. At least one barrier at least partially surrounds the device. At least one shield substance is disposed within the barrier. The undesirable substance is capable of permeating the barrier from the exterior of the barrier, while the shield substance is capable of permeating the barrier from the interior of the barrier. The permeation of the shield substance through the barrier from its interior precludes at least substantial permeation of the undesirable substance through the barrier from its exterior, preventing unwanted exposure of the device to the undesirable substance.

In some embodiments of the present invention, a system useful in the petroleum exploration and production industry for preventing unwanted exposure of a device to at least one undesirable substance includes a cable sheath surrounding the device and at least one shield substance provided within the cable sheath. The shield substance includes pressurized gas capable of permeating the cable sheath from the interior of the cable, while the undesirable substance may be partially gaseous and capable of permeating the cable sheath from the exterior of the cable. The permeation of the shield substance through the cable sheath precludes at least substantial permeation of the undesirable substance through the cable sheath from the exterior of the cable, preventing unwanted exposure of the device to the undesirable substance.

The present invention may also include embodiments of a system for shielding a device from contact with an undesirable substance. The system of these embodiments includes at least one barrier disposed at least partially between the device and the undesirable substance. At least one shield substance is disposed between the device and the barrier, the shield substance being capable of permeating the barrier. The permeation of the shield substance through the barrier precludes permeation of the undesirable substance through the barrier, shielding the device from contact with the undesirable substance.

In many embodiments, the present invention involves a method for preventing unwanted exposure of at least one device to at least one undesirable substance. The method of these embodiments includes providing at least one barrier around at least part of the device, wherein the undesirable substance may be located outside the barrier relative to the device. A shield substance is provided between the device and the barrier. The shield substance permeates the barrier, precluding permeation of the undesirable substance through the barrier and preventing unwanted exposure of the device to the undesirable substance.

Accordingly, the present invention includes features and advantages which enable it to advance technology for shielding devices from unwanted contact with or exposure to undesirable substances. Characteristics and advantages of the present invention described above and additional features and benefits will be readily apparent to those skilled in the art upon consideration of the following detailed description of preferred embodiments and referring to the accompanying drawings.

BRIEF DESCRIPTION OF THE DRAWINGS

For a detailed description of preferred embodiments of the invention, reference will now be made to the accompanying drawings wherein.

DETAILED DESCRIPTION OF THE INVENTION

Figure 1:
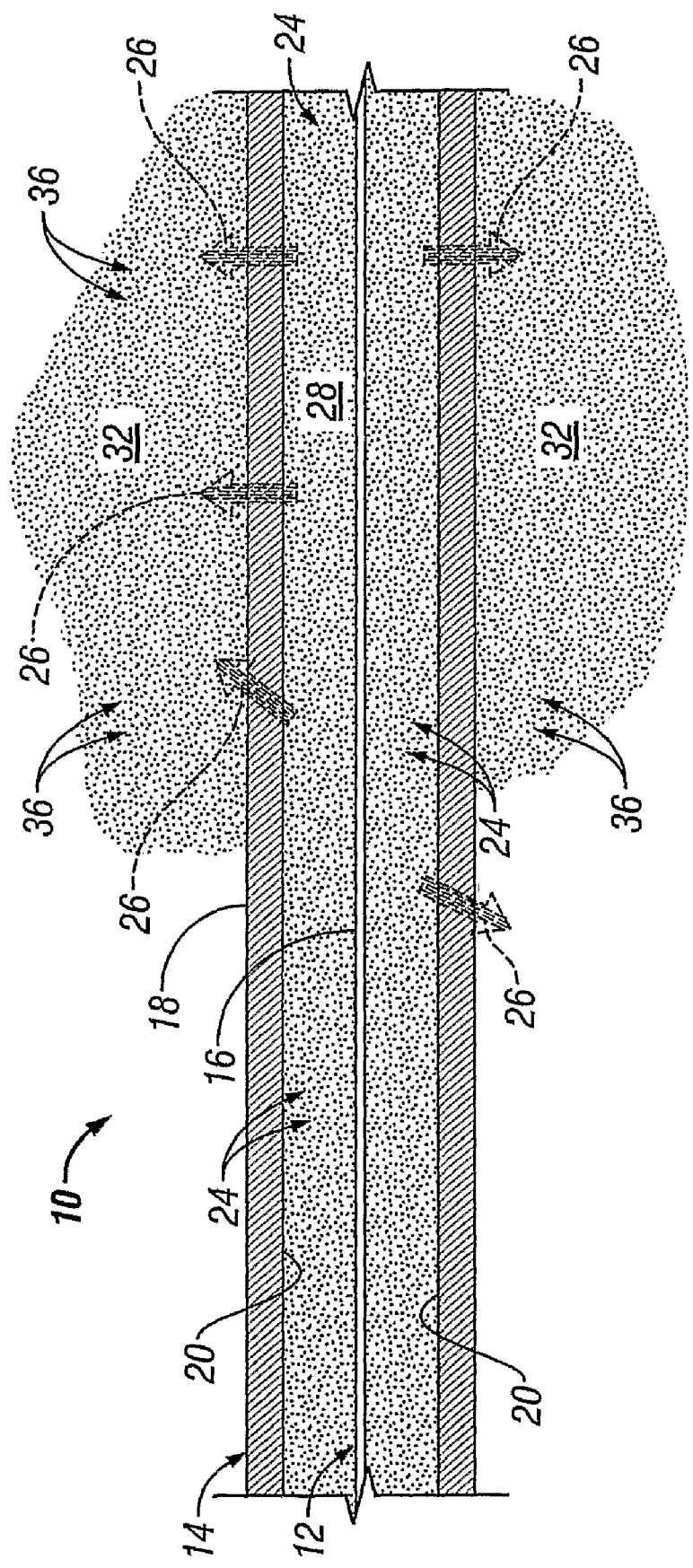
FIG. 1 is partial cross-sectional view of an example barrier containing a device and a shield substance in accordance with an embodiment of the present invention.

Presently preferred embodiments of the invention are shown in the above-identified figures and described in detail below. It should be understood that the appended drawings and description herein are of preferred embodiments and are not intended to limit the invention or the appended claims. On the contrary, the intention is to cover all modifications, equivalents, and alternatives falling within the scope of the invention as defined by the appended claims. In showing and describing the preferred embodiments, like or identical reference numerals are used to identify common or similar elements. The figures are not necessarily to scale and certain features and certain views of the figures may be shown exaggerated in scale or in schematic in the interest of clarity and conciseness.

As used herein and throughout all the various portions (and headings) of this patent, the use of the terms "invention", "present invention" and variations thereof is not intended to mean the claimed invention of any particular appended claim(s) or all of the appended claims. Accordingly, the subject or topic of each such reference is not automatically or necessarily part of, or required by, any particular claim(s) merely because of such reference.

Referring initially to the embodiment of FIG. 1, a system 10 is shown including a device 12 disposed within a barrier 14. The device 12 in this example is optical fibre 16. However, the device 12 could also, or instead, include one or more sensors, optical fibre sensors, machines, other items or materials, or any arrangement or combination thereof intended to be at least partially shielded or protected from exposure to, or contact with, one or more undesirable substance(s) 36 capable of permeating the barrier 14.

The illustrated barrier 14 is a tube, or cable sheath, 18. The barrier 14 may also, or instead, include one or more shell, casing, chamber, or any other configuration or form of enclosure that at least partially surrounds the device 12 or separates the device 12 from the undesirable substance(s) 36. The barrier 14 may be constructed of any suitable desirable material(s). Some examples of materials composing the barrier 14 are polymers, metals, and composites. Thus, the present invention is not limited by the nature, construction, type, or configuration of the device 12 or barrier 14, except as may be expressly stated in and required by any particular claim(s) appended hereto and only for such claims and any claims depending therefrom.

Still referring to the embodiment of FIG. 1, in accordance with the present invention, one or more shield substance(s) 24 capable of permeating the barrier 14 is provided in the interior 28 of the barrier 14. The shield substance 24 is provided in a manner that allows, or forces, it to permeate the barrier 14 from its interior 28 to its exterior 32 (See e.g., arrows 26) sufficient to hinder, or prevent, the permeation of the undesirable substance(s) 36 through the barrier 14 from the exterior 32 to the interior 28. Consequently, the device 12 is effectively shielded from unwanted exposure to, or contact with, the undesirable substance(s) 36.

In the example of FIG. 1, the shield substance 24 is pressurized helium provided in the interior 28 of the tube 18 and the undesirable substance 36 is hydrogen, which may be present on the exterior 32 of the tube 18. Both helium atoms and hydrogen molecules are small enough to permeate the tube 18. However, while exposure of the optical fibre 16 to hydrogen may cause unwanted degradation of its optical properties, exposure to helium, which is inert, does not. If desired, the system 10 may be designed so that the helium permeates the tube 18 across the entire surface area of the interior wall 20 of the tube 18 to preclude the permeation of hydrogen through and into the tube 18 sufficient to protect the optical fibre 16 from unwanted exposure to the hydrogen.

The present invention is not limited to the use of helium as a shield substance 24 or hydrogen as the undesirable substance 36. The shield substance 24 may be any suitable, desired substance or combination of substances. Other examples of shield substances 24 that may be useful or desired (in particular applications) are nitrogen, neon and deuterium. Likewise, the undesirable substance(s) 36 may be any one or more substance desired to be at least partially isolated from the device 12. Another example of an undesirable substance 36 is oxygen.

Figure 2:
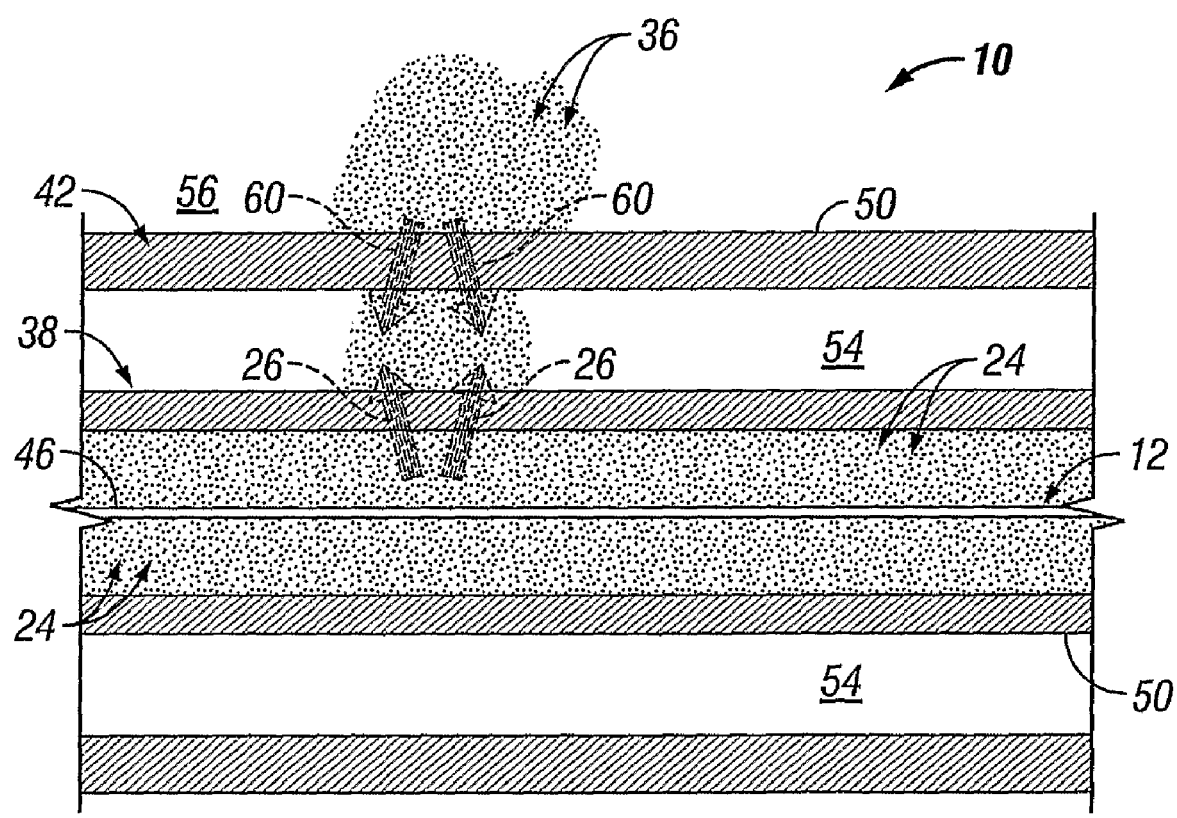
FIG. 2 is partial cross-sectional view of an example of a first barrier containing a device and a shielding substance and being at least partially surrounded by a second barrier in accordance with another embodiment of the present invention.

Referring now to the embodiment of FIG. 2, the device 12 is located within a first barrier 38 that is disposed within a second barrier 42. For example, the device 12 may be optical fibre 46 and the barriers 38, 42 may be tubes 50. The first barrier 38 of this embodiment contains the shield substance 24, such as pressurized helium or neon. The system 10 is configured so that the shield substance 24 permeates the first barrier 38 (see e.g., arrows 26) and enters the space 54 extending between the barriers 38, 42. While the undesirable substance 36 may permeate the second barrier 42 from its exterior 56 (see e.g., arrows 60), it is precluded, by the flow or pressure of the shield substance 24 through the first barrier 38, from permeating the first barrier 38 in a manner that would negatively affect the device 12. Flowing shield substance 24 through the inside of the first barrier 38 also serves to displace any trace of the undesirable substance 36 therein.

Still referring to FIG. 2, in other embodiments, the shield substance 24 may permeate the first barrier 38 and fill the space 54 sufficient to prevent or limit permeation of the undesirable substance 36 through the second barrier 42 and into the space 54. In yet other embodiments, the shield substance 24 may instead be supplied into the space 54 between the first and second barriers 38, 42, preventing or sufficiently hindering permeation of the undesirable substance 36 through the second barrier 42. Alternatively, the shield substance 24 may be flushed through the space 54 between the first and second barriers 38, 42 to displace any trace of the undesirable substance 36 therein. Still further embodiments may incorporate three or more barriers.

The present invention also includes embodiments in which the device is not necessarily enclosed within the barrier(s). Instead, the barrier may extend around or along only part of the device or its perimeter. Accordingly, any desired configuration or arrangement of one or more barrier, layer, baffle or other structure, spaces, pockets or a combination thereof, may be used in accordance with the present invention.

The present invention also includes embodiments having at least one barrier applied directly to, or formed upon, the device itself. For example, the barrier may be a coating of suitable material applied to the device. Examples of coating barriers are carbon, metal, and polymers. If desired, a porous undercoating may be applied to the barrier coating to facilitate disposition of the shield substance between the device and the barrier coating.

Any suitable components and technique may be used to ensure the appropriate supply and/or pressurization of the shield substance. For example, when the shield substance includes gas, one or more container, such as a bottle, of pressurized gas placed in fluid communication with the interior of the barrier may be used to supply the shield substance and maintain the desired pressure. For another example, the shield substance may be provided through piping from an outside source. For yet other examples, the shield substance may be produced at an externally located reactor, or within the barrier itself, such as by chemical reaction.

The present invention is not limited to any particular application or industry. Example industry applications include petroleum exploration and production, power generation, aerospace, defence, and transportation. Example applications include oil and gas wells, geothermal wells, observation wells, pipelines, and nuclear power generation systems.

An example method in accordance with the present invention includes providing a shield substance between at least one device and at least one barrier. The shield substance permeates the barrier, preventing or hindering the permeation of an undesirable substance through the barrier sufficient to protect the device from unwanted effects caused by exposure to, or contact with, the undesirable substance. For example, the shield substance could be pressurized gas provided under sufficient pressure to force it to permeate the barrier along the entire surface of the barrier.

Referring to FIG. 2, another example method in accordance with the present invention for use in petroleum well applications includes forming the first barrier 38 by welding metal tubing around optical fibre 46. The first barrier 38 and optical fibre 46 are then pumped into the second barrier 42, such as a pre-installed control line. The shield substance 24, such as pressurized helium or neon, is pumped into the first barrier 38 from an external source.

Preferred embodiments of the present invention thus offer advantages over the prior art and are well adapted to carry out one or more of the objects of the invention. However, the present invention does not require each of the components and acts described above. Any one or more of the above components, features and processes may be employed in any suitable configuration without inclusion of other such components, features, and processes. The present invention is thus not limited to the above-described embodiments and methods of operation. Moreover, while preferred embodiments of this invention have been shown and described, many variations, modifications and/or changes of the system, apparatus, and methods of the present invention, such as in the components, details of construction and operation, arrangement of parts and/or methods of use, are possible, contemplated by the patentee, within the scope of the appended claims, and may be made and used by one of ordinary skill in the art without departing from the teachings of the invention and scope of appended claims. Accordingly, additional features, capabilities, components, functions, methods, uses, and applications may be included.

The methods described above and any other methods which may fall within the scope of any of the appended claims can be performed in any desired suitable order and are not necessarily limited to the sequence described herein or as may be listed in any of the appended claims. Furthermore, the methods of the present invention do not require use of the particular components or embodiments shown and described in the present specification, but are equally applicable with any other suitable structure, form, and configuration of components. Thus, all matter herein set forth or shown in the accompanying drawings should be interpreted as illustrative and not limiting, and the scope of the invention and the appended claims is not limited to the embodiments described and shown herein.

What is claimed is:

1. An apparatus for preventing unwanted exposure of at least one device to at least one undesirable substance, the apparatus comprising:
   at least one barrier having a length that extends along a length of the device and at least partially surrounding the device, the undesirable substance is capable of permeating said barrier from the exterior of said barrier; and
   at least one shield substance disposed within said barrier, said shield substance being adapted to permeate said barrier from the interior of said barrier substantially along the entire length of said barrier to preclude, at least substantial permeation of the undesirable substance through said barrier from the exterior of said barrier to prevent unwanted exposure of the device to the undesirable substance.

2. The apparatus of claim 1 wherein said barrier encloses the device, and wherein said shield substance comprises pressurized gas.

3. The apparatus of claim 1 wherein said shield substance is produced at a location comprising one of the following: (i) a reactor external to said barrier and in fluid communication with said barrier; and (ii) within said barrier.

4. The apparatus of claim 2 wherein said pressurized gas comprises at least one among helium, nitrogen, deuterium, and neon; and
   wherein the undesirable substance comprises at least one among hydrogen and oxygen.

5. The apparatus of claim 1 wherein the device comprises at least one among at least one sensor, optical fibre sensor, and optical fibre.

6. The apparatus of claim 1 wherein said barrier includes at least one among at least one tubular member, shell, enclosure, and casing; and
   wherein said barrier is constructed of at least one among at least one polymer, metal, and composite.

7. The apparatus of claim 1 wherein the device is disposed within a first said barrier, said first barrier is disposed within a second said barrier and a space is disposed between said first and second barriers,
   wherein said shield substance is provided in said first barrier, permeates said first barrier and enters said space, whereby said shield substance at least substantially prevents the undesirable substance from permeating said first barrier.

8. The apparatus of claim 7 wherein said shield substance permeates said first barrier sufficient to prevent permeation of the undesirable substance through said first and second barriers.

9. The apparatus of claim 7 wherein said shield substance is provided in said space, permeates said second barrier and at least substantially prevents the undesirable substance from permeating said first and second barriers.

10. The apparatus of claim 7 wherein said shield substance is flushed through said space and displaces any trace of the undesirable substance therein.

11. The apparatus of claim 7 wherein said shield substance flows within said first barrier.

12. The apparatus of claim 1 wherein said barrier includes at least one coating applied to the device.

13. The apparatus of claim 12 wherein the coating is constructed of at least one among carbon, metal, and polymer.

14. The apparatus of claim 12 further including a porous undercoating applied to said at least one coating to facilitate disposition of said shield substance between the device and said barrier.

15. A system useful in the petroleum exploration and production industry for preventing unwanted exposure of a device to at least one undesirable substance, the system comprising:
   a cable sheath surrounding the device and having a length, wherein the undesirable substance is at least partially gaseous and capable of permeating said cable sheath from the exterior of said cable sheath; and
   at least one shield substance provided in said cable sheath, said shield substance including pressurized gas adapted to permeate said cable sheath from the interior of said cable sheath substantially along the entire length of said cable sheath to preclude at least substantial permeation of the undesirable substance through said cable sheath from the exterior of said cable sheath to prevent unwanted exposure of the device to the undesirable substance.

16. The system of claim 15 wherein the device is at least one among at least one sensor, optical fibre sensor, and optical fibre, and wherein the undesirable substance includes at least one among hydrogen and oxygen, and said shield substance includes at least one among helium, nitrogen, deuterium, and neon.

17. A system for shielding a device from contact with an undesirable substance, the system comprising:
   at least one barrier disposed at least partially between the device and the undesirable substance and having a length that extends along a length of the device, wherein the undesirable substance is capable of permeating said barrier; and
   at least one shield substance disposed between the device and said barrier, said shield substance adapted to permeate said barrier from the interior of said barrier substantially along the entire length of said barrier to preclude permeation of the undesirable substance through said barrier to shield the device from contact with the undesirable substance.

18. The system of claim 17 wherein the barrier includes at least two among carrier, tubular member, and baffle.

19. A method for preventing unwanted exposure of a device to an undesirable substance, the method comprising:
   providing a barrier around at least part of the device, wherein the undesirable substance is disposed outside the barrier relative to the device and the barrier has a length that extends along a length of the device;
   providing a shield substance between the device and the barrier; and
   using the shield substance to permeate the barrier substantially along the entire length of the barrier to preclude permeation of the undesirable substance through the barrier to prevent unwanted exposure of the device to the undesirable substance.

20. The method of claim 19 wherein the shield substance is pressurized gas, further including providing the shield substance under sufficient pressure to force the shield substance to permeate the barrier along the entire interior surface of the barrier.

21. The method of claim 20 further including providing at least two barriers, the first barrier surrounding the device and the second barrier surrounding the first barrier.

22. The method of claim 21 further including providing the shield substance between the first and second barriers.

23. The method of claim 22 wherein the device is optical fibre, further including forming the first barrier by placing the optical fibre within metal tubing and pumping the first barrier and optical fibre into the second barrier.

* * * * *